United States Patent
Olsson et al.

(10) Patent No.: US 8,971,322 B2
(45) Date of Patent: Mar. 3, 2015

(54) MULTICAST INTERWORKING SYSTEMS AND METHODS

(75) Inventors: Jonathan Olsson, Sollentuna (SE); Panagiotis Saltsidis, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 182 days.

(21) Appl. No.: 13/201,750

(22) PCT Filed: Mar. 3, 2009

(86) PCT No.: PCT/IB2009/000410
§ 371 (c)(1),
(2), (4) Date: Aug. 16, 2011

(87) PCT Pub. No.: WO2010/100517
PCT Pub. Date: Sep. 10, 2010

(65) Prior Publication Data
US 2011/0299529 A1    Dec. 8, 2011

(51) Int. Cl.
*H04L 12/28* (2006.01)
*H04L 12/18* (2006.01)

(52) U.S. Cl.
CPC .................... *H04L 12/185* (2013.01)
USPC ........................... 370/390; 370/401

(58) Field of Classification Search
USPC ............... 370/256, 389, 395.5, 222
See application file for complete search history.

(56) References Cited

U.S. PATENT DOCUMENTS

| 6,853,639 | B1 | 2/2005 | Watanuki et al. | |
| 7,787,480 | B1 * | 8/2010 | Mehta et al. | 370/401 |
| 2006/0198323 | A1 * | 9/2006 | Finn | 370/256 |
| 2007/0165626 | A1 * | 7/2007 | Sultan et al. | 370/389 |
| 2007/0263554 | A1 * | 11/2007 | Finn | 370/256 |
| 2012/0320758 | A1 * | 12/2012 | Jocha et al. | 370/241.1 |

FOREIGN PATENT DOCUMENTS

| EP | 1772991 A | 4/2007 |
| EP | 1772991 A1 * | 4/2007 |
| EP | 1772991 A1 * | 4/2007 |

OTHER PUBLICATIONS

Savola CSC/FUNET P: "Overview of the Internet Multicast Routing Architecture; rfc5110.txt" IETF Standard, Internet Engineering Task Force, IETF, CH, Jan. 1, 2008 (XP015055179 ISSN: 0000-0003 p. 17 par.2.7.2.*
Media Access Control (MAC) Bridges and Virtual Bridge Local Area Networks, IEEE Computer Society, IEEE Std. 802.1Q—2011 (revision of IEEE Std 802.1Q-2005).*
Savola CSC/FUNET P: "Overview of the Internet Multicast Routing Architecture; rfc 5110.txt" IETF Standard, Internet Engineering Task Force, IETF, CH. Jan. 1, 2008 (XP015055179 ISSN: 0000-0003 p. 17 par. 2.7.2.*

(Continued)

*Primary Examiner* — Andrew Lai
*Assistant Examiner* — Jamaal Henson
(74) *Attorney, Agent, or Firm* — Patent Portfolio Builders PLLC

(57) ABSTRACT

Systems and methods according to these exemplary embodiments provide for methods and systems for interworking between an Internet Group Management Protocol (IGMP) and a MAC address Multiple Registration Protocol (MMRP). For example, an IGMP join or leave message which is received at node (700) is translated (702) into an equivalent MMRP message for forwarding into an MMRP portion of a network (704).

18 Claims, 6 Drawing Sheets

(56) References Cited

OTHER PUBLICATIONS

International Search Report for PCT/IB2009/000410 mailed Aug. 6, 2009.
Savola, P., et al., "Overview of the Internet Multicast Routing Architecture, rfc5110.txt," IETF Standard, Internet Engineering Task Foce, IETF, CH, Jan. 1, 2008, pp. 1-25, XP015055179.
Fang, L., et al., "The evolution of carrier ethernet services-requirements and deployment case studies [next-generation carrier ethernet]," IEEE Communications Magazine, IEEE Service Center, Piscataway, NJ, US, vol. 45, No. 3, Mar. 1, 2008, pp. 69-76, XP011205399.
Mace, G., "Multicast Handling in 802.1 AVB Infrastructure," IEEE, Piscataway, NJ, US, Nov. 20, 2007, pp. 1-12 XP040382939.
Allan, D., et al., "Simplified VPLS-PBB Interworking via MMRP; draft-allan-mmrp-for-mac-i-n-mac-00.txt," Internet Engineering Task Force, IETF, Standard Working Draft, Internet Society, (ISOC), CH, Jul. 7, 2008, pp. 1-9, XP015057260.
IEEE, "IEEE Standard for Local and Metropolitan Area Networks—Virtual Bridged Local Area Networks—Amendment 7: Multiple Registration Protocol, Std 802.lak-2007 (Amendment to IEEE Std. 802.1QTM-2005)," IEEE Standard, Piscataway, NJ, US, Jan. 1, 2007, pp. 1-107, XP017601789.
Cain, B., et al., "Internet Group Management Protocol, Version 3; rfc3376.txt," IETF Standard, Internet Engineering Task Force, IETF, CH, Oct. 1, 2002, pp. 1-54, XP015009135.
International Preliminary Report on Patentability issued in corresponding International application No. PCT/IB2009/000410, date of issuance Sep. 6, 2011.
W. Fenner; "Internet Group Management Protocol, Version 2"; Xerox PARC, Network Working Group, RFC 2236; IETF Tools, Internet Engineering Task Force; pp. 1-24; Nov. 1997.

\* cited by examiner

MULTICAST INTERWORKING SYSTEMS AND METHODS

TECHNICAL FIELD

The present invention relates generally to communications systems and in particular to methods and systems for distributing media using multicast transmissions.

BACKGROUND

As the level of technology increases, the options for communications have become more varied. For example, in the last 30 years in the telecommunications industry, personal communications have evolved from a home having a single rotary dial telephone, to a home having multiple telephone, cable and/or fiber optic lines that accommodate both voice and data. Additionally cellular phones and Wi-Fi have added a mobile element to communications. Similarly, in the entertainment industry, 30 years ago there was only one format for television and this format was transmitted over the air and received via antennas located at homes. This has evolved into both different standards of picture quality such as, standard definition television (SDTV), enhanced definition TV (EDTV) and high definition TV (HDTV), and more systems for delivery of these different television display formats such as cable and satellite. Additionally, services have grown to become overlapping between these two industries. As these systems continue to evolve in both industries, the service offerings will continue to merge and new services can be expected to be available for a consumer. Also these services will be based on the technical capability to process and output more information, for example as seen in the improvements in the picture quality of programs viewed on televisions, and therefore it is expected that service delivery requirements will continue to rely on more bandwidth being available through the network including the "last mile" to the end user.

Another related technology that impacts both the communications and entertainment industries is the Internet. The physical structure of the Internet and associated communication streams have also evolved to handle an increased flow of data. Servers have more memory than ever before, communications links exist that have a higher bandwidth than in the past, processors are faster and more capable and protocols exist to take advantage of these elements. As consumers' usage of the Internet grows, service companies have turned to the Internet (and other IP networks) as a mechanism for providing traditional services. These multimedia services include Internet Protocol television (IPTV, referring to systems or services that deliver television programs over a network using IP data packets), Internet radio, video on demand (VoD), live events, voice over IP (VoIP), and other web related services received singly or bundled together.

Multicast is one technique used to distribute IPTV content to users. As used herein, the term "multicast" refers to a broadcast or point-to-multipoint connection which is established between an end user or an end user's device and a content provider or content provider's equipment, e.g., a stream of IP packets which have an address associated with a group of potential recipients. Internet Group Management Protocol (IGMP) is an IP-based control protocol that is used to signal membership of an end station to a multicast group (e.g., associated with an IPTV channel) in a network. So-called IGMP snooping refers to a process for listening to IGMP traffic wherein, e.g., a Layer 2 switch "listens in" on IGMP signaling between hosts and routers by processing layer 3 IGMP packets and compiling group port lists based on snooped IGMP report messages and IGMP leave messages. IGMP snooping may be employed by intermediary nodes in an IPTV network to prune multicast trees in the network to make efficient use of communication resources.

However, such IGMP snooping may cause problems under certain circumstances. For example, if IGMP snooping is used in an IPTV network having an intervening, bridged configuration, the IGMP snooping generates a layer violation between layer 3 (e.g., the IP layer) and layer 2 (e.g., the Ethernet layer) since it is an IP protocol that controls the behavior of multicast streams in Ethernet bridges. This layer violation may cause problems in Provider Bridged networks (PBNs), e.g., 802.1ad type networks and Provider Backbone Bridged networks (PBBNs), e.g., 802.1ah type networks, because IGMP does not take into account additional VLAN information which is introduced with these technologies.

Consider, for example, the IPTV service scenario illustrated in FIG. 1. Therein, two IPTV service providers 10 and 12 operate in the same 802.1ad type network 14 to provide IPTV service. The IPTV service providers 10 and 12 have overlapping multicast IP address spaces which are used to provide IPTV service to various customer sites 20-28. For example, IPTV service provider 10 provides IPTV service to customers 20, 24 and 26 via S-VLAN links 16 through various (unnumbered) Ethernet switches. IPTV service provider 12 provides IPTV service to customers 22, 24 and 28 through S-VLAN links 18. Since the IPTV service providers 10 and 12 have overlapping multicast IP address spaces, these two service providers may have two different IPTV channels (i.e., one apiece) which use the same multicast IP address. If IGMP snooping is used in this network 14 when the same multicast IP address is assigned to two different groups on the two different VLANs, then it will not be possible to distinguish between users joining a first multicast group associated with a channel provided by service provider 10 and users joining a second multicast group associated with a channel provided by service provider 12, which makes IGMP snooping inefficient.

Accordingly, it would be desirable to overcome deficiencies associated with IGMP snooping in certain multicast network topologies, e.g., bridged networks.

SUMMARY

Systems and methods according to the present invention provide systems and methods for interworking between an Internet Group Management Protocol (IGMP) and a MAC address Multiple Registration Protocol (MMRP). An object of the exemplary embodiments is to provide for efficient IGMP snooping in bridged networks. Among other advantages, these exemplary embodiments enable IGMP snooping to be performed in systems across IGMP and MMRP domains.

According to one exemplary embodiment a method for interworking between an Internet Group Management Protocol (IGMP) and a MAC address Multiple Registration Protocol (MMRP) includes reception of an IGMP message at a node. The received message is translated into an MMRP message and then forwarded from the node.

According to another exemplary embodiment, a node (46, 50, 600) which provides for interworking between an Internet Group Management Protocol (IGMP) and a MAC address Multiple Registration Protocol (MMRP) in a communications network includes a communications interface which receives an IGMP message at the node. The node also includes a processor which translates the IGMP message into an MMRP message using an Interworking Function, and which forwards the resulting MMRP message from the node.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

As mentioned above, it is desirable to overcome deficiencies associated with IGMP snooping in certain types of bridged networks. Bridged networks include bridge elements, which are essentially switches for switching data between network segments at the data layer (Layer 2). Ethernet networks, for example, use so-called transparent bridging to switch data between network segments. Each unicast frame of data is analyzed when it is received at a bridge element to determine to which network segment the MAC address provided in the frame should be directed. If the bridge has no previous information about the correlation between the received MAC address and the network segment to which the frame should be delivered, then it broadcasts the received frame to all of the network segments (except the segment from which the frame was received). The bridge can dynamically correlate MAC addresses with specific network segments by "learning" the MAC source addresses of the received frames and associating those with the originating network segment.

The IEEE assigned IETF the Organizational Unique Identifier (OUI) 01-00-5E, which the IETF has chosen to indicate that the packet carried by the Ethernet frame is a multicast IP packet. The industry has adopted to use this OUI, or prefix, to indicate that this Ethernet frame carries an IP multicast packet. However, the OUI prefix occupies three bytes of the MAC address, leaving only three additional bytes (since MAC addresses have a size of six bytes each) in which to capture the IP multicast address itself during a conversion.

Figure 1:
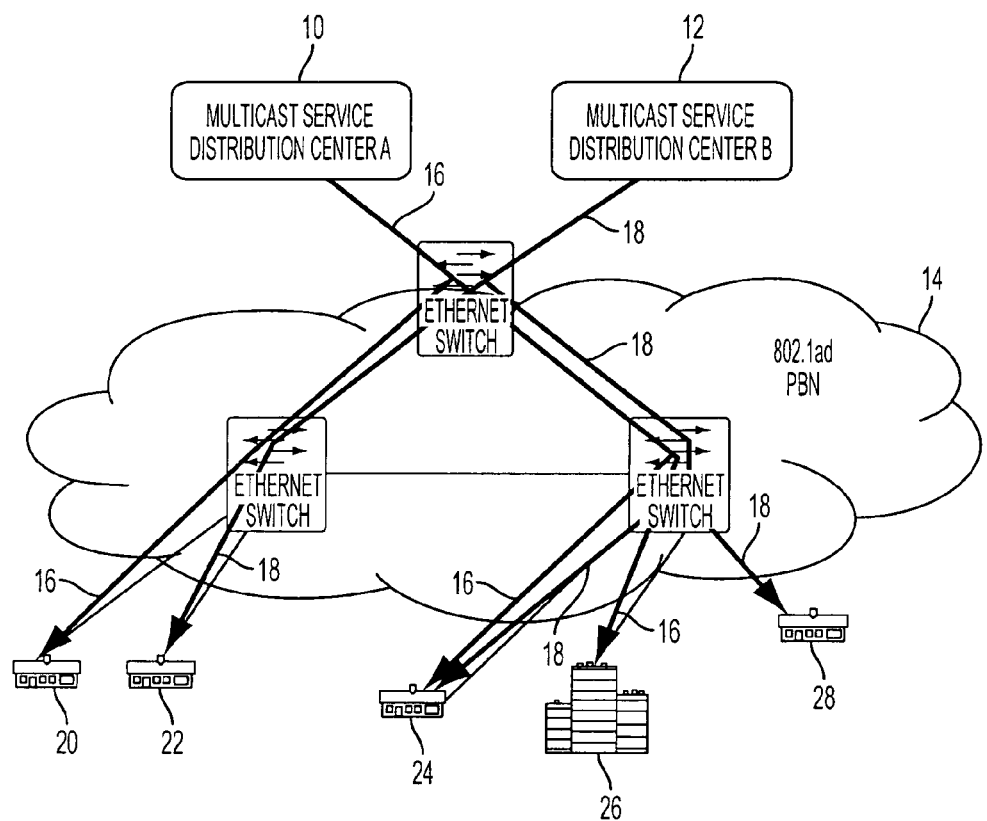
FIG. 1 illustrates an IPTV network having overlapping multicast domains in which exemplary embodiments can be implemented.
Figure 2:
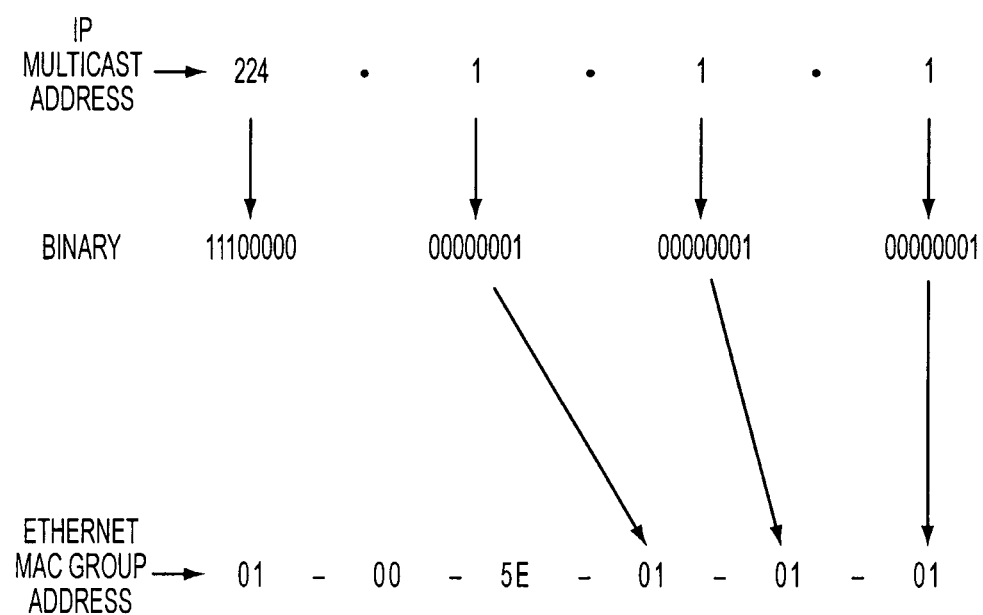
FIG. 2 depicts an exemplary conversion from an IP multicast address to an Ethernet MAC group address.

For example, as shown in FIG. 2, the IP multicast address 224.1.1.1 would be converted into an Ethernet MAC group address of 01-00-5E-01-01-01. More specifically, to perform the conversion of an IP multicast address into an Ethernet MAC group address, the IP multicast address is first converted to binary. Then, the first 8 bits of the IP multicast address are discarded, the first bit in the second octet of the IP multicast address is set to zero and the last 23 bits IP multicast address are directly mapped into the last three bytes of the Ethernet MAC group address and the OUI is appended as the leading three bytes. It will be appreciated that the requirement to discard the more significant bits of the IP multicast address in this conversion process provides the potential for Ethernet multicast address overlap discussed above in the Background section. For example, the IP multicast address 223.1.1.1 would, like 224.1.1.1, also be converted to a MAC group address of 01-00-5E-01-01-01.

As mentioned earlier, IGMP is a protocol used to establish and maintain multicast groups and to connect clients to multicast routers, e.g., via Layer 2 switches. Currently, there are three versions of IGMP-IGMPv1 defined in RFC 1112, IGMPv2 defined in RFC 2236 and IGMPv3 defined in RFC 3376. IGMP snooping, e.g., as described above, is a process whereby a switch can utilize IGMP to prune multicast trees according to multicast group membership requests. For example, when a switch that is snooping detects an IGMP report from a host for a given multicast group, the switch may then add that host's port number to the multicast list for that group. Conversely, when the switch detects an IGMP Leave message, that switch may then remove the host's port from the table entry. In this way, a switch need not broadcast all received multicast frames to all of the segments of the network.

Standard IGMP snooping will not be able to distinguish between two different VLANs using overlapping IP multicast addresses. Multiple Registration Protocol (MRP) was developed by the IEEE 802.1 working group to provide for a form of selective multicasting in LAN environments which, at least in part, addresses this problem. Specified in the standards document IEEE Std. 802.1ak-2006, approved Mar. 22, 2007, and published on Jun. 22, 2007, the MRP provides for user registration with bridge elements for receipt of multicast traffic. The MRP registration process calls for so-called "soft state" registrations, which require periodic refreshing by user devices otherwise the registration will time out. Instead of broadcasting the received information to all network segments upon receipt of a multicast Ethernet frame, the bridge elements may instead forward such frames to those network segments having devices which have registered for such multicasts. A device can register with bridge elements for multicasts associated with multiple MAC addresses using an MRP application referred to as MMRP, e.g., Multiple MAC address Registration Protocol. Unlike IGMP, MMRP operates purely on Layer 2, e.g., Ethernet.

Figure 3:
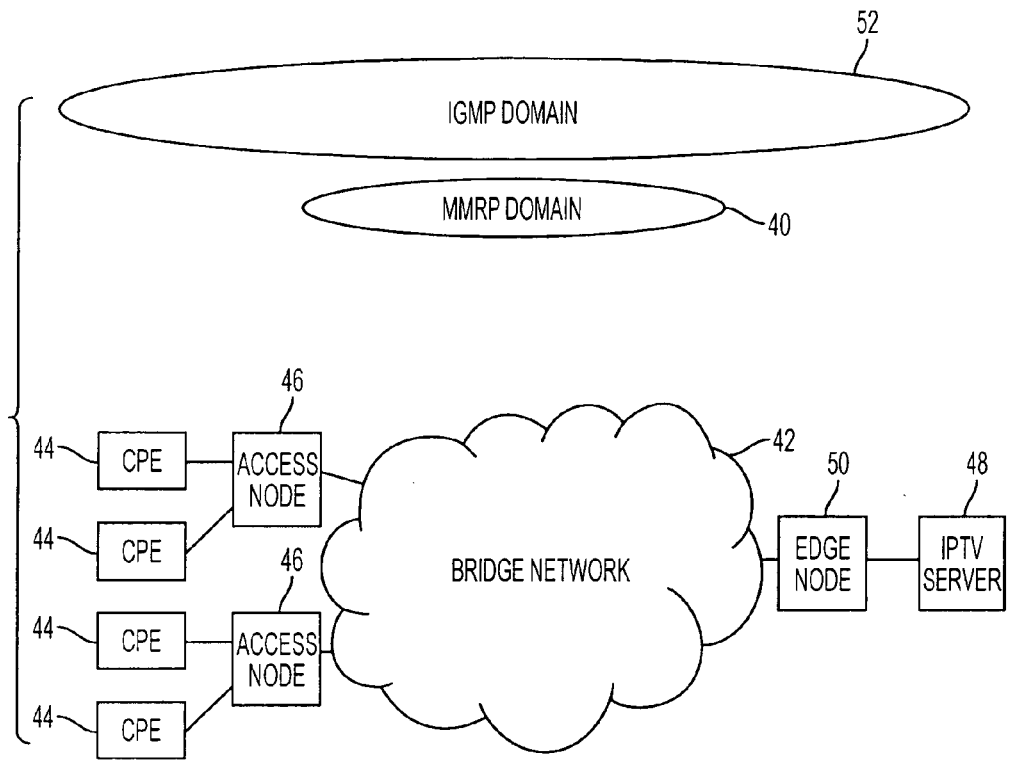
FIG. 3 depicts IGMP and MMRP domains relative to an exemplary IPTV system.

Today there exist a number of legacy devices, e.g., set-top boxes, enterprise access points, etc., which employ IGMP for multicast control. If MMRP becomes widely adopted by vendors and deployed, it is anticipated that there will be situations where this newer protocol is employed in, for example, bridged networks that are connected to IGMP devices. Consider, for example, the deployment shown in FIG. 3 wherein the MMRP domain 40 is coextensive with the bridge network 42. On the other hand, the IGMP domain 52 extends through and beyond the MMRP domain 40, e.g., in the network regions which connect the consumer premise equipment (CPE) 44 to the bridge network 42 via access nodes 46, and in the regions which connect application servers such (as IPTV server 48) to the bridge network 42 via edge nodes 50.

Figure 4:
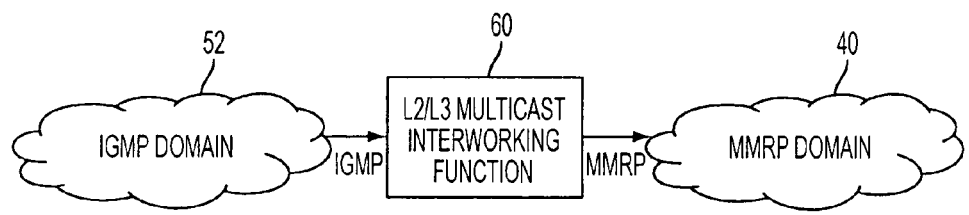
FIG. 4 shows an L2/L3 Multicast Interworking Function between IGMP and MMRP domains according to exemplary embodiments.

However, as mentioned earlier, IGMP snooping does not work well in all types of bridged networks. Thus, according to exemplary embodiments, a Layer 2/Layer 3 (L2/L3) multicast Interworking Function or proxy 60 is provided as shown in FIG. 4. The L2/L3 multicast Interworking Function 60 according to these exemplary embodiments can, for example, provide for the translation of IGMP messages into MMRP messages in a manner which facilitates IGMP snooping. The L2/L3 multicast Interworking Function 60 can reside at the ingestion points of IGMP into an MMRP enabled network, e.g., at the access nodes 46 and the edge node 50 in the exemplary network shown in FIG. 3, and operates to forward (rather than terminate) the IGMP messages through the network. Exemplary ingestion points which can include L2/L3 multicast Interworking Functions include, but are not limited to, devices such as digital subscriber line access multiplexers (DSLAMs), fiber switches, edge switches and edge routers.

Figure 5:
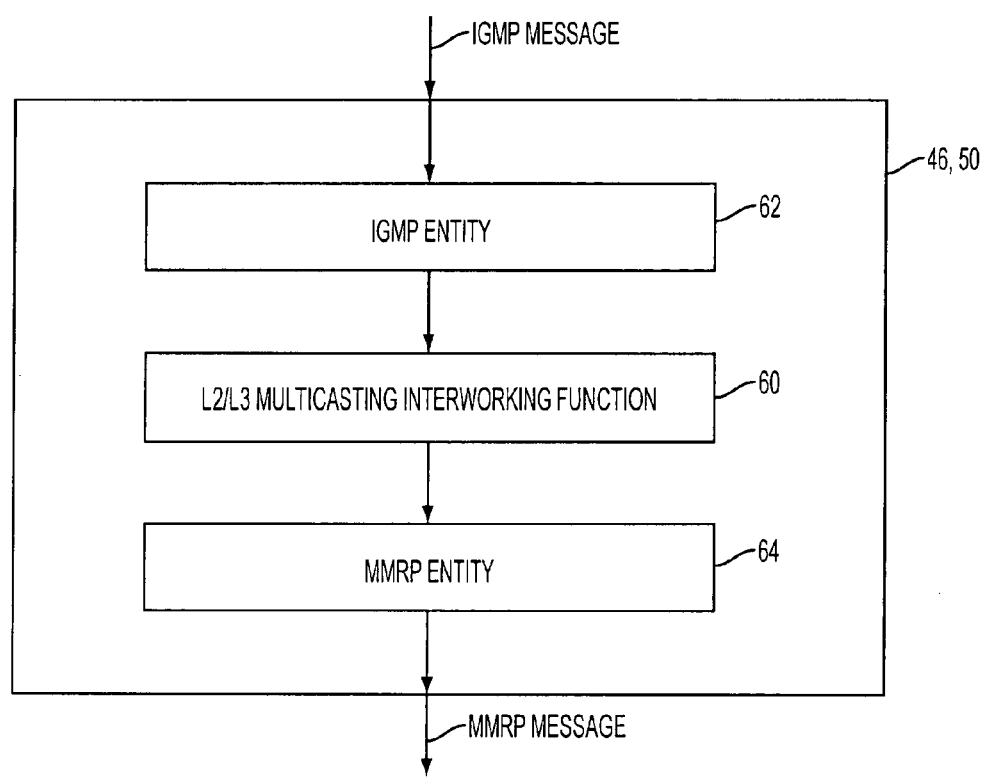
FIG. 5 depicts a node including an IGMP entity, an L2/L3 Multicast Interworking Function and an MMRP entity according to exemplary embodiments.

For example, an access node 46 or an edge node 50 that receives an IGMP message will be able to identify the originating port, and the originating VLAN, associated with the received IGMP message. This information may then be passed on to the L2/L3 multicast Interworking Function 60 according to this exemplary embodiment, along with, for example, the original IGMP message itself (or a parsed version thereof). According to one exemplary embodiment, a single bridge element (node) 46, 50 which is located at the edge of the network can implement all three of: (1) an IGMP entity 62, (2) an MMRP entity 64 and (3) the L2/L3 multicast Interworking Function 60 as shown in FIG. 5. The IGMP and MMRP entities 62, 64 will, according to one exemplary embodiment, have separate state machines which manage and control their respective domains, and also an internal interface linking them to the L2/L3 multicast Interworking Function 60.

The L2/L3 multicast Interworking Function 60 operates to translate the information which it receives from the IGMP entity 62 into a corresponding MMRP message for forwarding to the MMRP entity 64 (and subsequently for forwarding out of the node 46, 50). Two basic building block messages, common to both IGMP and MMRP, will now be considered as examples of this translation process, specifically Join messages and Leave messages. Starting with Join messages, an IP client initiates an IGMP Membership Report when it wishes to join a multicast group. In IGMPv1 and IGMPv2, the IGMP Membership Report contains the IP multicast address of the group that the client wishes to join. IGMPv3, however, permits a single message to contain the registration state information for multiple multicast groups. This means that a single IGMPv3 message could signal multiple join and leave messages at the same time for multiple IP clients. The state information for a given group is stored in a group record in the IGMPv3 Membership Report message.

The relevant data contained in the group records for the translation process performed by L2/L3 multicast Interworking Function 60 according to this exemplary embodiment is found in fields referred to as the record type field, the multicast address field, and the source address list of the Membership Report message. A record type field in a Membership Report message having a value of either MODE-IS-EXCLUDE or CHANGE TO EXCLUDE_MODE indicates that a node or source wishes to receive multicast streams from, e.g., a server, having an address indicated by the value in the multicast address field of the Membership Report message. Alternatively, such a record type field value can indicate that the interface state has changed to allow a node having a particular source address, or plural nodes having an array of source addresses, to receive frames from the device associated with the address in the multicast address field.

According to this exemplary embodiment, when the IGMP entity 62 receives an IGMP Membership Report message, the IGMP entity 62 either (1) parses the IGMP Membership Report message and sends a message to the L2/L3 Multicast Interworking Function 60 including a list of the following data sets: the VLAN ID on which the IGMP message was received, an indicator that the received message type was a join/leave message and the Multicast IP Address contained in the received IGMP Membership Report message, specifically the value from the multicast address field of the group record(s) of this received message; or (2) it sends a message with including the VLAN ID on which the IGMP message was received and the original IGMP Membership Report. In the latter case, the L2/L3 Multicast Interworking Function 60 parses the IGMP Membership Report message. The L2/L3 Multicast Interworking Function 60 will process the incoming message and create an equivalent message(s) to be sent to the MMRP entity 64. For example, the message to be sent to the MMRP entity 64 can contain the following data: the VLAN ID for which multicast frames are received, the multicast MAC address and an indicator that the message type is join message.

The MAC group address which is provided in the translated message by the L2/L3 Multicast Interworking Function 60 is the MAC equivalent of the IP multicast address that was provided to the L2/L3 Multicast Interworking Function 60 from the received IGMP message. Thus, L2/L3 Multicast Interworking Function 60 is also responsible according to these exemplary embodiments for translating the IP multicast addresses from received IGMP messages into MAC group addresses in the translated messages to the MMRP entity. This translation is performed on a one to one basis and the whole IP multicast address is copied to the last four bytes in the MAC address. The first two bytes can take any value, with the exception of the first two bits in the first byte. The first bit, which is the individual/group (I/G) address bit, (i.e., the least significant bit of the first byte) is used to identify the destination address as a group address and, thus, it is set to 1. The universally or locally administered (U/L) address bit, which is the bit of the first byte adjacent to the I/G address bit is also set to 1, indicating that the entire address (i.e., 48 bits) has been locally administered. Using this exemplary translation process according to these exemplary embodiments, a received IP multicast address having a value of, purely as an illustrative example, 224.1.1.1 in the IGMP message could be translated to a MAC group address having a value of 03-00-E0-01-01-01 for use in preparing the translated join message to be transmitted to the MMRP entity 64.

Having discussed translation of IGMP join messages (Membership Report messages) according to these exemplary embodiments, translation of leave messages from IGMP to MMRP according to these exemplary embodiments will now be discussed. When an IP client wishes to leave a multicast group, or signal a state change for a given interface, that node will either send and an IGMP Leave Group message or an IGMP v3 Membership Report message depending upon the version of IGMP which is being used in the system. An IGMP Leave Group message includes a single multicast address for which an IP client no longer wishes to be a group member. As previously mentioned, an IGMP v3 Membership Report message may contain multiple registration information elements. For example, an IGMP v3 Membership Report message which is used by a node to leave one or more multicase groups will include a group record with a record type field having a value of MODE_IS_INCLUDE or CHANGE-TO INCLUDE-MODE, which value indicates that one or more source addresses shall no longer be members of the group address.

When the IGMP entity 62 receives one of the abovementioned messages, it will, according to this exemplary embodiment, create a message to the L2/L3 Multicast Interworking Function 60 which contains the following data: the VLAN ID on which the IGMP message was received, an indication of the received message type (in this case, leave), and the multicast IP address value from the corresponding field. The L2/L3 Multicast Interworking Function 60 then parses the incoming message from the IGMP entity 62 and creates an equivalent message to be sent to the MMRP entity 64. According to this exemplary embodiment, the message to be sent to the MMRP entity 64 contains: the VLAN ID for which multicast frames are received, the MAC group address and the message type of leave. The MAC group address is the MAC equivalent to the multicast IP address that originated in the IGMP message which has been translated in the manner described above with respect to received join messages. The translated message is then transmitted to the MMRP entity 64.

Various advantages of these exemplary embodiments will be appreciated by those skilled in the art. For example, these exemplary embodiments provide for seamless interoperability between IGMP based and MMRP based networks. Additionally, they allow efficient and granular control of multicast in a PBN network based on L2 control protocols without needing to upgrade consumer premise equipment (CPE). Additionally, such embodiments permits service providers to send multicast streams using overlapping multicast address spaces.

Figure 6:
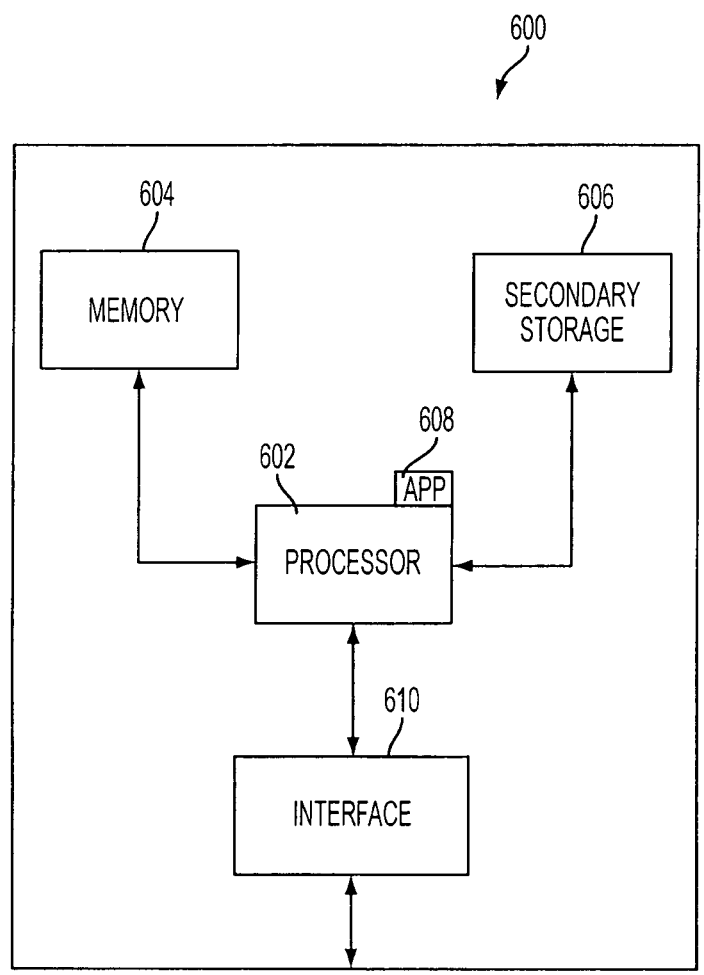
FIG. 6 illustrates an interworking node according to exemplary embodiments.

An exemplary communications or interworking node 600 for providing interworking between an Internet Group Management Protocol (IGMP) and a MAC address Multiple Registration Protocol (MMRP) in which the foregoing exemplary embodiments can be implemented will now be described with respect to FIG. 6. Interworking node 600, e.g., a DSLAM, fiber switch, edge switch or edge router, can contain a processor 602 (or multiple processor cores), memory 604, one or more secondary storage devices 606, a software application (or multiple applications) 608 and an interface unit 610 to facilitate communications between communications node 600 and the rest of the network. The communications interface 610 can receives an IGMP message at the node, and the processor 602 can then translate the IGMP message into an MMRP message using an Interworking Function as described above, prior to forwarding that MMRP message from the node.

Figure 7:
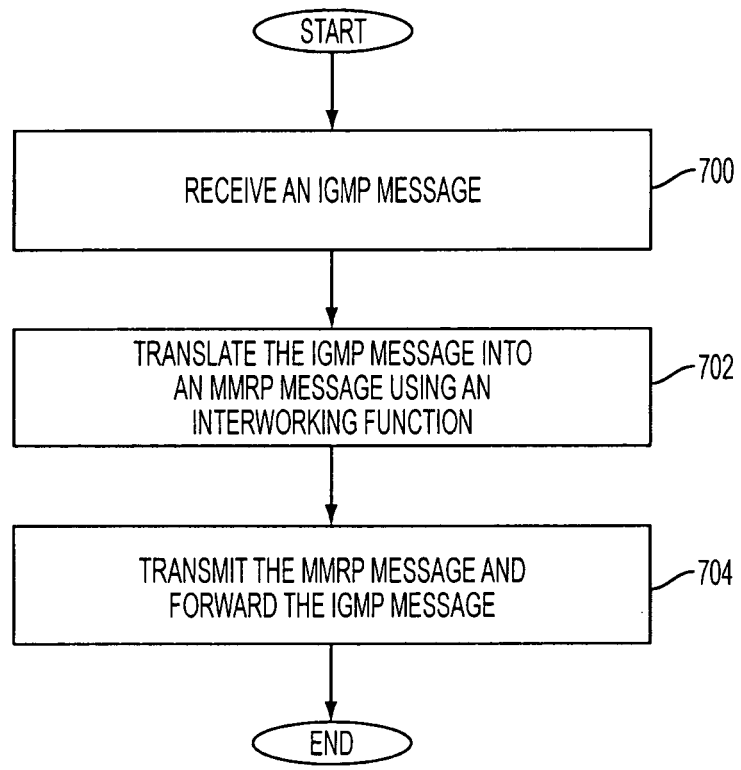
FIG. 7 is a flow chart illustrating a method for interworking between IGMP and MMRP protocols according to exemplary embodiments.

Utilizing the above-described exemplary systems according to exemplary embodiments, a method for interworking between an Internet Group Management Protocol (IGMP) and a MAC address Multiple Registration Protocol (MMRP) can include the steps illustrated in the flow chart of FIG. 7. Therein, at step 700, an IGMP message is received at a node. The IGMP message is translated into an MMRP message using an Interworking Function at step 702, and transmitted from the node at step 704, e.g., along with the forwarded IGMP message.

The above-described exemplary embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. A method for interworking between an Internet Group Management Protocol (IGMP) and a MAC address Multiple Registration Protocol (MMRP) comprising:
   receiving an IGMP message related to members of a multicast group at a node;
   translating said IGMP message into an MMRP message using an Interworking Function; and
   transmitting said MMRP message from said node,
   wherein multicast traffic is selectively directed to the members of the multicast group.

2. The method of claim 1, wherein said step of translating further comprises:
   determining an originating virtual local area network (VLAN) associated with said IGMP message; and
   providing a VLAN identification to said Interworking Function.

3. The method of claim 1, wherein said step of transmitting said MMRP message from said node further comprises:
   forwarding said IGMP message with said MMRP message.

4. The method of claim 1, wherein said step of translating further comprises:
   translating, by said Interworking Function, an IP multicast address associated with said IGMP message into a corresponding MAC group address.

5. The method of claim 4, wherein said step of translating said IP multicast address associated with said IGMP message into a corresponding MAC group address is performed in a manner which preserves at least a most significant bit of said IP multicast address.

6. The method of claim 1, wherein said step of translating further comprises:
   providing, to said Interworking Function, a virtual local area network (VLAN) identification associated with said IGMP message, a MAC group address associated with an IP multicast address of said IGMP message, a message type indicator, and at least one of said IGMP message and a parsed version of said IGMP message; and
   translating, by said Interworking Function, said at least one of said IGMP message and said parsed version of said IGMP message into said MMRP message.

7. The method of claim 1, wherein said node is one of an access node, a core node and an edge node.

8. The method of claim 7, wherein said node is connected to a bridged network.

9. The method of claim 1, wherein the IGPM message is a IGMP Membership Report message.

10. The method of claim 1, wherein the MMRP message causes at least one of the members to join or to leave the multicast group.

11. A node which provides for interworking between an Internet Group Management Protocol (IGMP) and a MAC address Multiple Registration Protocol (MMRP) in a communications network, said node comprising:
    a communications interface which receives an IGMP message related to members of a multicast group at said node; and
    a processor which translates said IGMP message into an MMRP message using an Interworking Function, and transmits said MMRP message from said node,
    wherein multicast traffic is selectively directed to the members of the multicast group.

12. The node of claim 11, wherein said processor determines an originating virtual local area network (VLAN) associated with said IGMP message, and provides a VLAN identification to said Interworking Function.

13. The node of claim 11, wherein processor forwards said IGMP message with said MMRP message.

14. The node of claim 11, wherein said processor translates an IP multicast address associated with said IGMP message into a corresponding MAC group address.

15. The node of claim 14, wherein said processor translates said IP multicast address into a corresponding MAC group address in a manner which preserves at least a most significant bit of said IP multicast address.

16. The node of claim 11, wherein said processor provides, to said Interworking Function, a virtual local area network (VLAN) identification associated with said IGMP message, a MAC group address associated with an IP multicast address of said IGMP message, a message type indicator, and at least one of said IGMP message and a parsed version of said IGMP message, and wherein said Interworking Function translates said at least one of said IGMP message and said parsed version of said IGMP message into said MMRP message.

17. The node of claim 11, wherein said node is one of an access node, a core node and an edge node.

18. The node of claim 17, wherein said node is connected to a bridged network.

\* \* \* \* \*

UNITED STATES PATENT AND TRADEMARK OFFICE
CERTIFICATE OF CORRECTION

| | | |
|---|---|---|
| PATENT NO. | : 8,971,322 B2 | Page 1 of 1 |
| APPLICATION NO. | : 13/201750 | |
| DATED | : March 3, 2015 | |
| INVENTOR(S) | : Olsson et al. | |

It is certified that error appears in the above-identified patent and that said Letters Patent is hereby corrected as shown below:

In the Specification

In Column 6, Lines 60-61, delete "multicase" and insert -- multicast --, therefor.

Signed and Sealed this
Twenty-fifth Day of August, 2015

Michelle K. Lee
*Director of the United States Patent and Trademark Office*